United States Patent [19]
Chou

[11] Patent Number: 5,813,605
[45] Date of Patent: Sep. 29, 1998

[54] IRRIGATION ASSEMBLY OF POTTED PLANTS

[76] Inventor: Tsung-Li Chou, 2nd Fl., No. 15, Lane 70, Hulin St., Taipei, Taiwan

[21] Appl. No.: 854,835

[22] Filed: May 12, 1997

[51] Int. Cl.$^6$ ........................................... B05B 12/12
[52] U.S. Cl. ................................. 239/64; 239/63; 239/67; 47/48.5; 137/78.3
[58] Field of Search ........................... 239/63, 64, 67–70; 137/78.3; 47/48.5, 79, 81

[56] References Cited

U.S. PATENT DOCUMENTS

| | | | |
|---|---|---|---|
| 4,315,599 | 2/1982 | Biancardi | 239/63 X |
| 4,542,762 | 9/1985 | Littlehale | 239/63 X |
| 5,097,626 | 3/1992 | Mordoch | 47/48.5 X |
| 5,315,787 | 5/1994 | Schleicher et al. | 47/48.5 X |

FOREIGN PATENT DOCUMENTS

6054629  3/1994  Japan ......................................... 239/63

Primary Examiner—Lesley D. Morris
Attorney, Agent, or Firm—Beveridge, DeGrandi, Weilacher & Young, LLP

[57] ABSTRACT

The present invention relates to an irrigation assembly for potted plants including a housing for containing batteries and a motor therein with a drain hole formed on one side of the housing. A water pump extends from the bottom of the housing to extend into a container for pumping the water into the housing through a water conduit and discharging the water from the drain hole. A water outlet device is connected to the drain hole of the housing through a water discharge pipe. A control circuit PCB has two rotary switches for setting a fixed-humidity mode or a fixed-amount mode and a control circuit for controlling the electrical conduction opportunity of the motor formed thereon. A humidity sensing rod is connected to the housing by electric wires and is formed in a long strip with a plurality of electrode contacts being formed thereon, and being directly inserted into the soil of the potted plants. The moisture inside the soil can be detected by the humidity sensing rod and is compared with the set humidity value, and proceeds timely water supplying when insufficient moisture is detected.

10 Claims, 7 Drawing Sheets

IRRIGATION ASSEMBLY OF POTTED PLANTS

BACKGROUND OF THE INVENTION

1. Field of the Invention

The present invention relates to an irrigation assembly for potted plants and more particularly, to an irrigation assembly for timely supplying the water automatically to prevent the potted plants from being subjected to inadequate or irregular supplies of water.

2. Background of the Related Art

The keeping of potted plants in homes has been very popular for a long time but problems often occur in the maintenance of those plants. For example, different plants have different needs in the supply of water and it is not always easy for an owner to remember on which days certain plants should be watered to keep them in the best condition. Furthermore, if an owner is away for a long period of time the plants will suffer from a lack of water. Alternatively, the plants may be exposed to inappropriate watering by a person such as a neighbor, who may not be familiar with all the different watering needs involved. Thus, there is a long unfulfilled need for an irrigation assembly which can automatically supply the exact amount of water at the desired intervals. The present invention provides a solution based on the limitations described above.

SUMMARY OF THE INVENTION

It is a primary object of the present invention to provide an irrigation assembly for potted plants which can proceed timely water supplying automatically to prevent the potted plants from being exposed to inappropriate supplies of water.

In accordance with one aspect of the invention, there is provided an irrigation assembly for potted plants which can timely supply water automatically to the potted plants and can be set in a fixed-humidity mode or in a fixed-amount mode based on the features of the potted plants. In a fixed-humidity state, the humidity of the soil can be detected through a humidity sensing rod inserted into the soil and then, the detected humidity value is compared with a predetermined humidity upper limit/lower limit value. The irrigation assembly supplies water in an insufficient humidity condition of the soil and the predetermined humidity value is set to adjust the humidity with reference to various plants.

In accordance with another aspect of the invention, there is provided an irrigation assembly for potted plants which is in a fixed-amount state. The time between watering days and the amount of the water supplied every time can be set through rotary switches on a control panel to suit the different requirements of plants. Between the fixed-humidity mode and the fixed-amount mode, the control circuit does not need to be changed, it only requires to switch by an internal switch.

In accordance with still another aspect of the invention, there is provided an irrigation assembly for potted plants in which a test key and an indicator light are installed on the control panel for respectively testing whether the irrigation assembly operates normally and further providing an on-off indication every other fixed time.

In accordance with yet another aspect of the invention, there is provided an irrigation assembly for potted plants with a convenient design in the housing thereof. A control circuit PCB is designed to be a control panel type in which the rotary switches are installed on a front surface thereof and the control circuit is formed on a rear surface thereof. Furthermore, the control circuit PCB permits easy access to batteries therein for easy replacement thereof.

In accordance with yet still another aspect of the invention, there is provided an irrigation assembly for potted plants in which the humidity sensing rod is formed as a long strip where a long strip carbon film and a plurality of spaced separate carbon films are formed on respective surfaces thereon. Each separate carbon film is in a series connection with a respective first end of one of a plurality of resistors and a respective second end of each of the resistors is connected in parallel to form a single electrode. This electrode and another electrode formed by the long strip carbon film described above are simultaneously connected to the control circuit PCB. The humidity values at different positions are detected by inserting the humidity sensing rod into the soil whereby the control circuit determines the humidity of the soil through an RC transfer circuit after the amount of the water contained in the soil is detected by the humidity sensing rod with the above-described double-sided carbon films and then converted to a soil impedance value. Additionally, the components of this assembly are inexpensive to buy and maintain. Thus, in addition to achieving advantages of automatically controlling the humidity and low cost, the double-sided carbon films of the long strip shaped humidity sensing rod can prevent oxidization or corrosion to provide a longer lifetime in usability. Furthermore, the design of the humidity sensing rod in a long strip form provides for detecting all of the humidity values in different positions, whether high or low, in the soil at the same time. Therefore, the present invention is superior to the conventional particle shaped semiconductor humidity sensing device which has the limitation of detecting a single-point area only and provides a stable and remarkable design in detecting humidity.

BRIEF DESCRIPTION OF THE DRAWINGS

The above objective, other features and advantages of the present invention will become more apparent by describing in detail the preferred embodiments thereof with reference to the attached drawings, in which.

DETAILED DESCRIPTION OF THE PREFERRED EMBODIMENT

Figure 1:
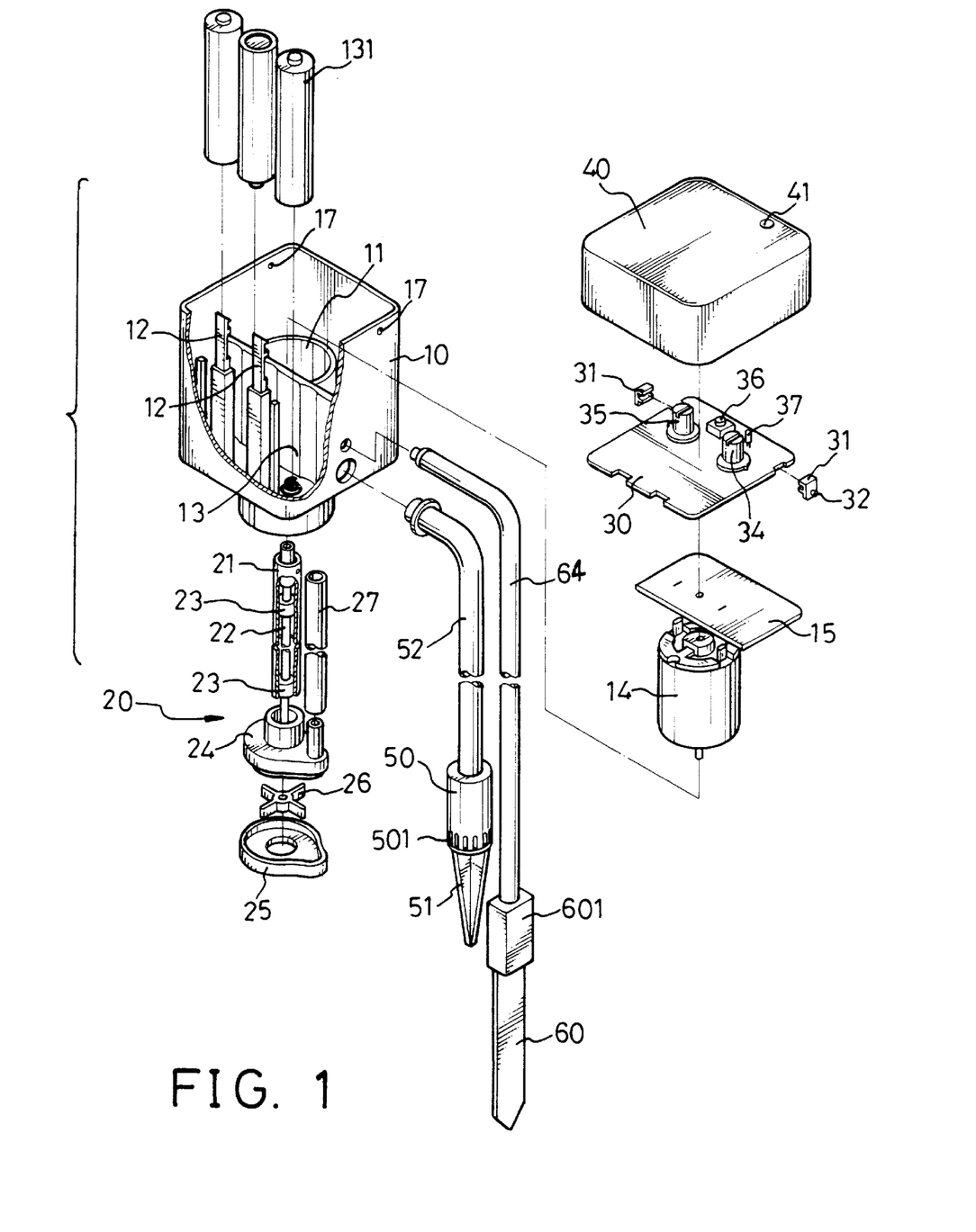
FIG. 1 is an exploded view of an irrigation assembly in accordance with the present invention.
Figure 3:
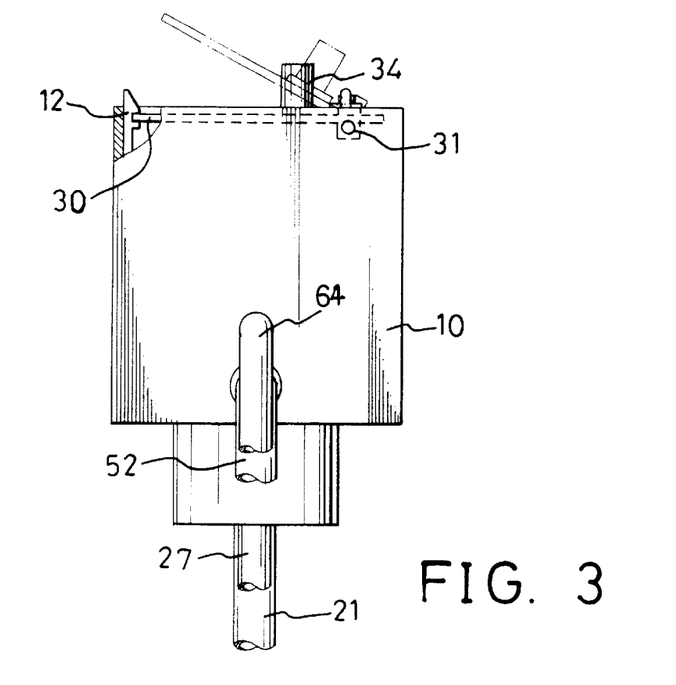
FIG. 3 is a plan view of the control circuit-printed circuit board of an irrigation assembly in accordance with the present invention.

As shown in FIG. 1, an irrigation assembly in accordance with the present invention includes a housing 10 with a motor case 11 and a battery case 13 installed therein for coupling with a motor 14 and receiving batteries 131. A water pump 20 extends downwardly from a bottom side of the housing 10. A water outlet device 50 and a humidity sensing rod 60 are respectively connected to a water discharge pipe 52 and a waterproof cable 64 extending outwardly from one side of the housing 10. A bottom printed circuit board (PCB) 15 with a motor driving circuit formed thereon is linked with and positioned above the motor 14. Each of a pair of pivot holes 17 is defined in an upper portion of a respective one of two opposed sides of the housing 10. A control circuit PCB 30 includes two rotary switches 34, 35, a test key 36 and an indicator light 37. Each of a pair of clips 31 is respectively secured to one of the two opposed sides of the control circuit PCB 30. Each clip 31 has a stub 32 extending from an end face thereof and each stub 32 is pivotally received in a respective one of the pivot holes 17, whereby the control circuit PCB 30 is pivotally received in the housing 10 and access to the batteries 131 is accordingly possible, as shown in FIG. 3. A plurality of spring blades 12 are formed in the battery case 13 of the housing 10 and extend upwardly for providing position confinement when the circuit control PCB 30 is disposed within the housing 10. A plurality of contact points on a bottom surface of the control circuit PCB 30 correspond to the positions where the batteries are located so that the electric power of the batteries 131 is directly supplied to the control circuit PCB 30 without requiring connections through electric wires. An application specific integrated circuit (ASIC) central processing unit (CPU) of a surface-mount type forming a control loop is provided to decide whether the motor 14 is turned on or turned off and the motor running time is long or short. Alternatively, the pumping operation and operating time of the water pump 20 are determined depending on the comparison between the setting states of the two rotary switches 34, 35.

Figure 2:
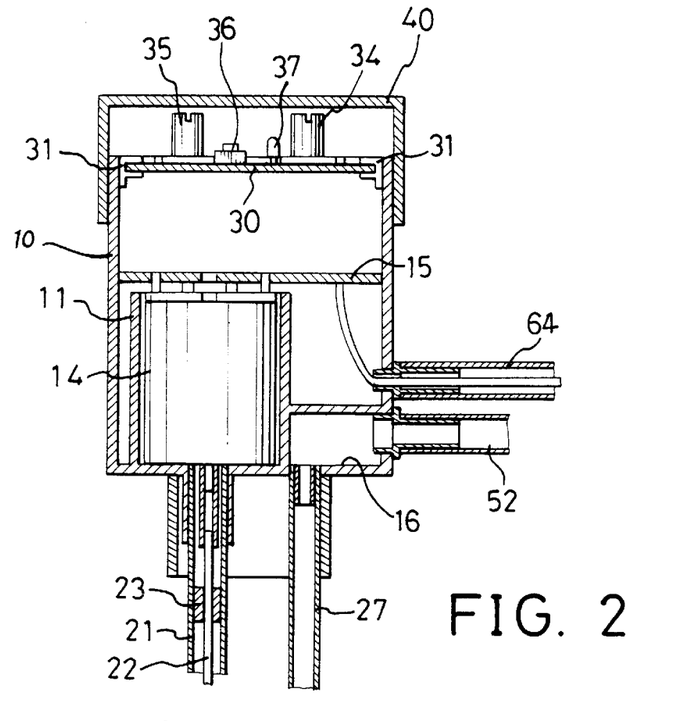
FIG. 2 is an expanded sectional view of the housing in connection with a water pump of an irrigation assembly in accordance with the present invention.

The water pump 20 on the left side of the FIG. 1 includes a shaft sleeve 21 through which a driving shaft 22 extends therein and a plurality of positioning bushings 23 mounted around the shaft 22, a water conduit 27, a water-pumping plate 24, a bottom cap 25 and a set of motor blades 26. A top end of the driving shaft 22 in the shaft sleeve 21 is connected to a rotary shaft of the motor 14 and a bottom end thereof is connected to the set of motor blades 26. A top end and a bottom end of the shaft sleeve 21 are respectively connected to the housing 10 and the water-pumping plate 24 while the set of motor blades 26 is positioned between the water-pumping plate 24 and the bottom cap 25. A bottom end of the water conduit 27 is connected to one side of the water-pumping plate 24 and a top end thereof is connected to the water discharge pipe 52 through a water conducting chamber 16 formed in a corner side on the bottom surface of the housing 10, as shown in FIG. 2. In this configuration, water is pumped into the water discharge pipe 52 as a result of the turning of the set of motor blades 26 of the water pump 20 after the motor 14 has been turned on.

FIG. 2 shows an assembly of the priorly-mentioned components. Referring to FIGS. 1 and 2, a waterproof cover 40 with a transparent observation hole 41 prevents water from leaking into the irrigation assembly.

Figure 5:
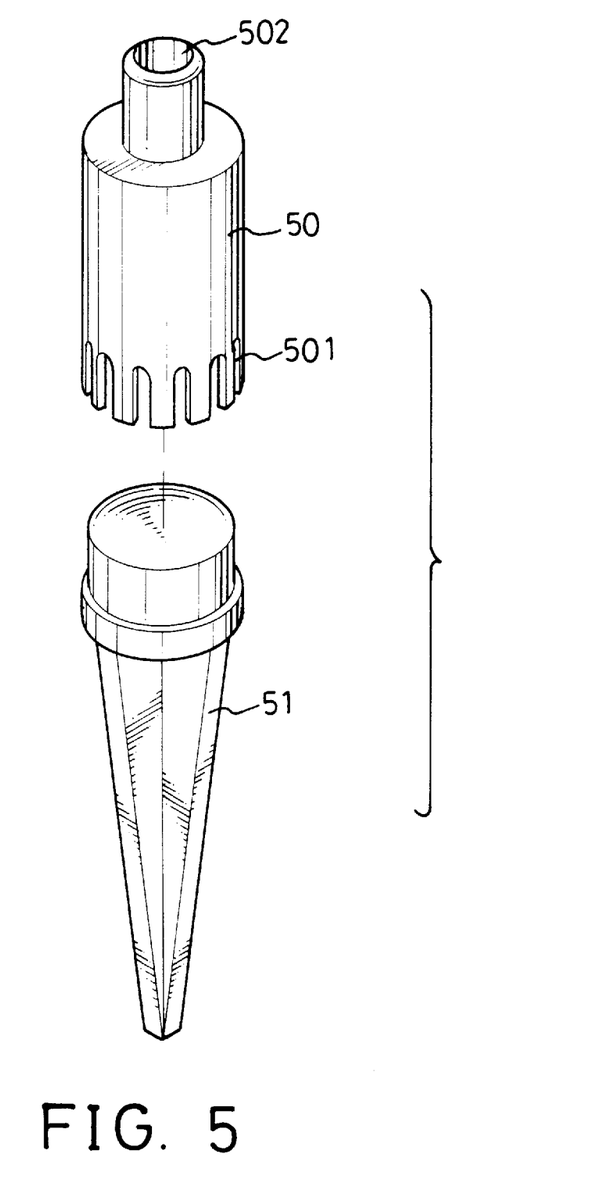
FIG. 5 is a structural diagram of the water outlet device of an irrigation assembly in accordance with the present invention.
Figure 6:
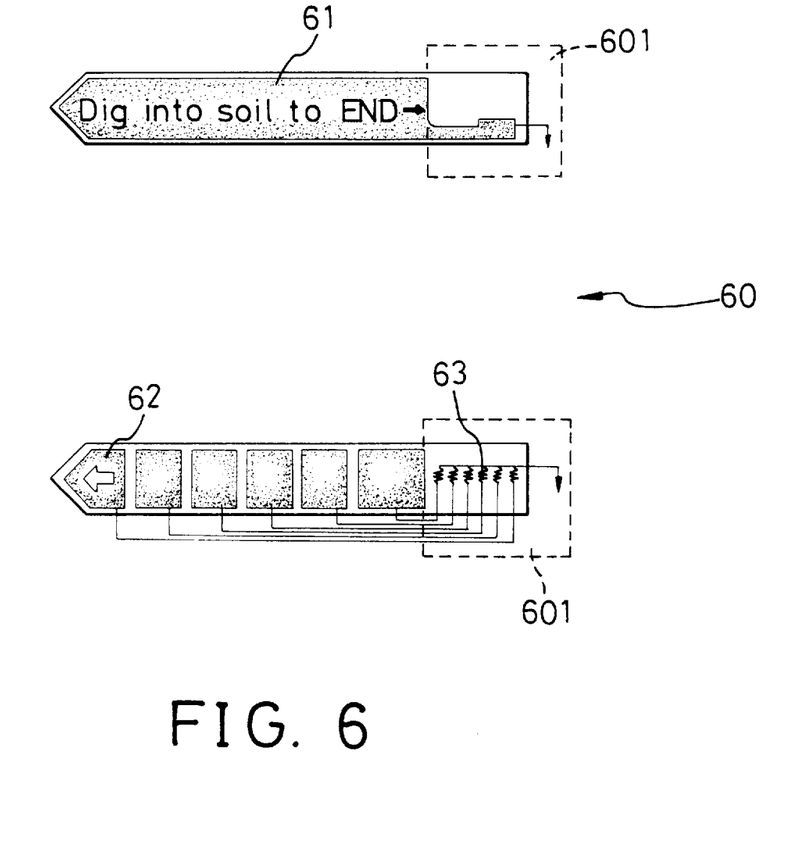
FIG. 6 schematically shows the carbon films on the front and rear surfaces of the humidity sensing rod in accordance with the present invention.

The detailed constructions of the water outlet device 50 and the humidity sensing rod 60 are shown in FIG. 5 and FIG. 6 respectively. With reference to FIG. 5, a lower portion of the water outlet device 50 is connected to a spike 51 by mutual coupling. A passage 502 extends from a top of the water outlet device 50 to the lower portion thereof and communicates with a plurality of outlets 501. FIG. 6 shows a front side and a rear side of the humidity sensing rod 60, in which carbon films are in a long strip first form 61 and in a second form of separate strips 62 spaced apart from each other. The long strip of carbon film 61 and the separate strips of carbon films 62 are respectively formed on the surfaces of the front side and the rear side thereof. Each separate carbon film 62 has an internal copper foil extending to a fixed base 601 respectively and in a series connection with a load therein individually, and then connects in parallel to form a single electrode extending outwardly. Therefore, there is an output signal produced between the single electrode described above and another electrode formed by the long strip shaped carbon film 61. A function of the humidity sensing rod 60 is that different impedances are formed on the carbon films of the front side surface and the rear side surface thereof through the impedances generated by the water contained in the soil. The separate carbon films 62 at different positions are provided for detecting the impedance values of the water contained in various soil locations, thereby the output impedance is inversely changed with the soil humidity so that the moisture of the soil can be detected.

The humidity sensing rod 60 described above also simultaneously detects the moisture of the soil in different depths which prevents oxidization or corrosion due to water invasion from adopting the design of using the carbon films to provide a longer lifetime in usability.

Figure 9:
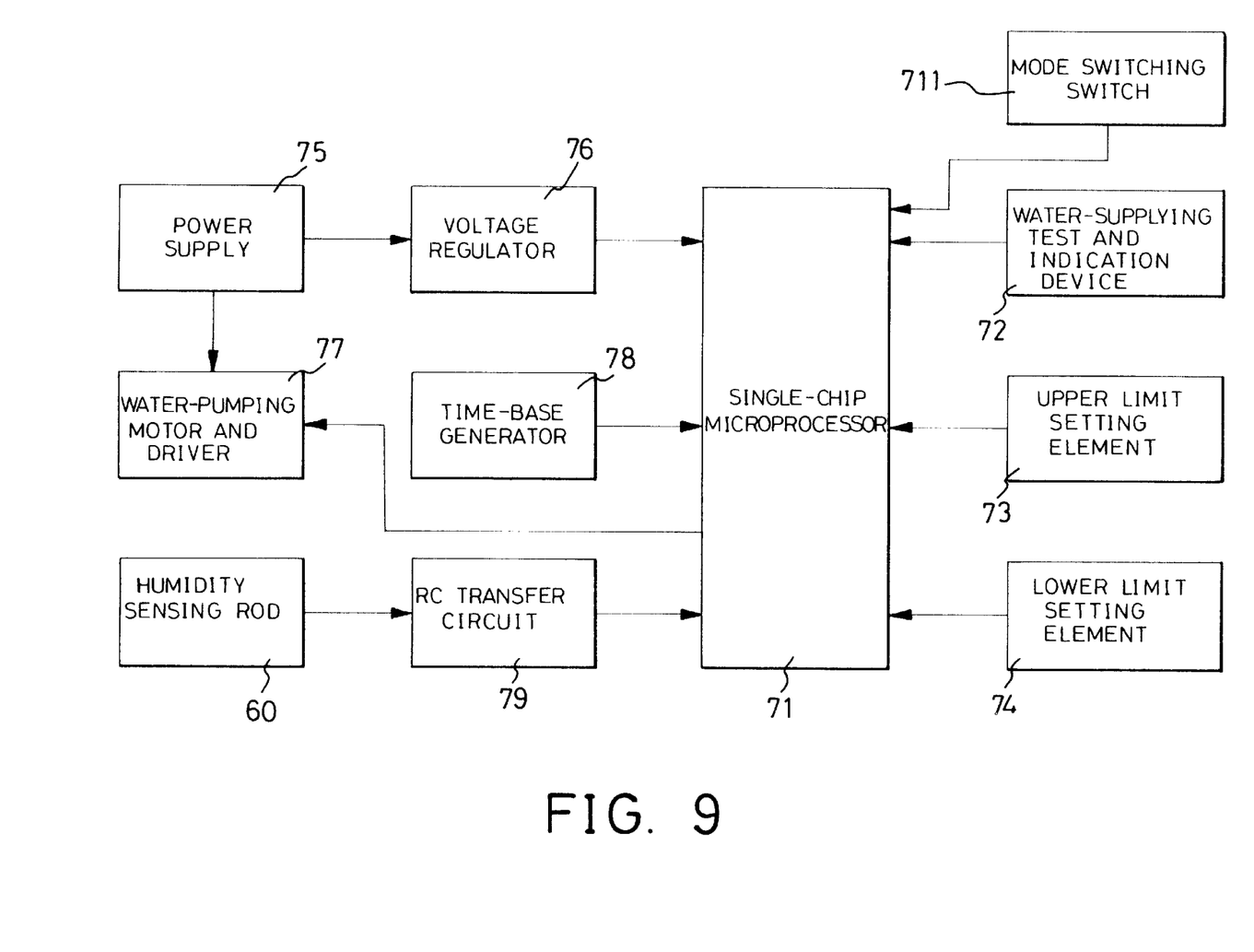
FIG. 9 shows a block diagram of the control circuit in accordance with the present invention.

The block diagram of the control circuit of the present invention, as shown in FIG. 9, is composed of a single-chip microprocessor 71, a mode-switching switch 711, a water-supplying test and indication device 72, an upper limit setting element 73, a lower limit setting element 74, a power supply 75, a voltage regulator 76, a water-pumping motor and driver 77, a time-base generator 78, an RC transfer circuit 79 and a humidity sensing rod 60. The upper limit setting element 73 and the lower limit setting element 74, which are a plurality of selection contacts formed by the two aforenamed rotary switches 34, 35, are connected to the single-chip microprocessor 71. The RC transfer circuit 79 which is made up of resistors and capacitors is connected to an output terminal of the humidity sensing rod 60. This RC transfer circuit 79 can be charged responsive to the impedance indicated by the humidity sensing rod 60. The humidity of the soil is determined based on a relative relation between the time required to charge the capacitors to a predetermined value and the moisture of the soil. The operation of the water-pumping motor and driver 77 is controlled by the output of the single-chip microprocessor 71. The mode-switching switch 711 on one side of the single-chip microprocessor 71 serves as a switch between the fixed-humidity mode and the fixed-amount mode.

Figure 4:
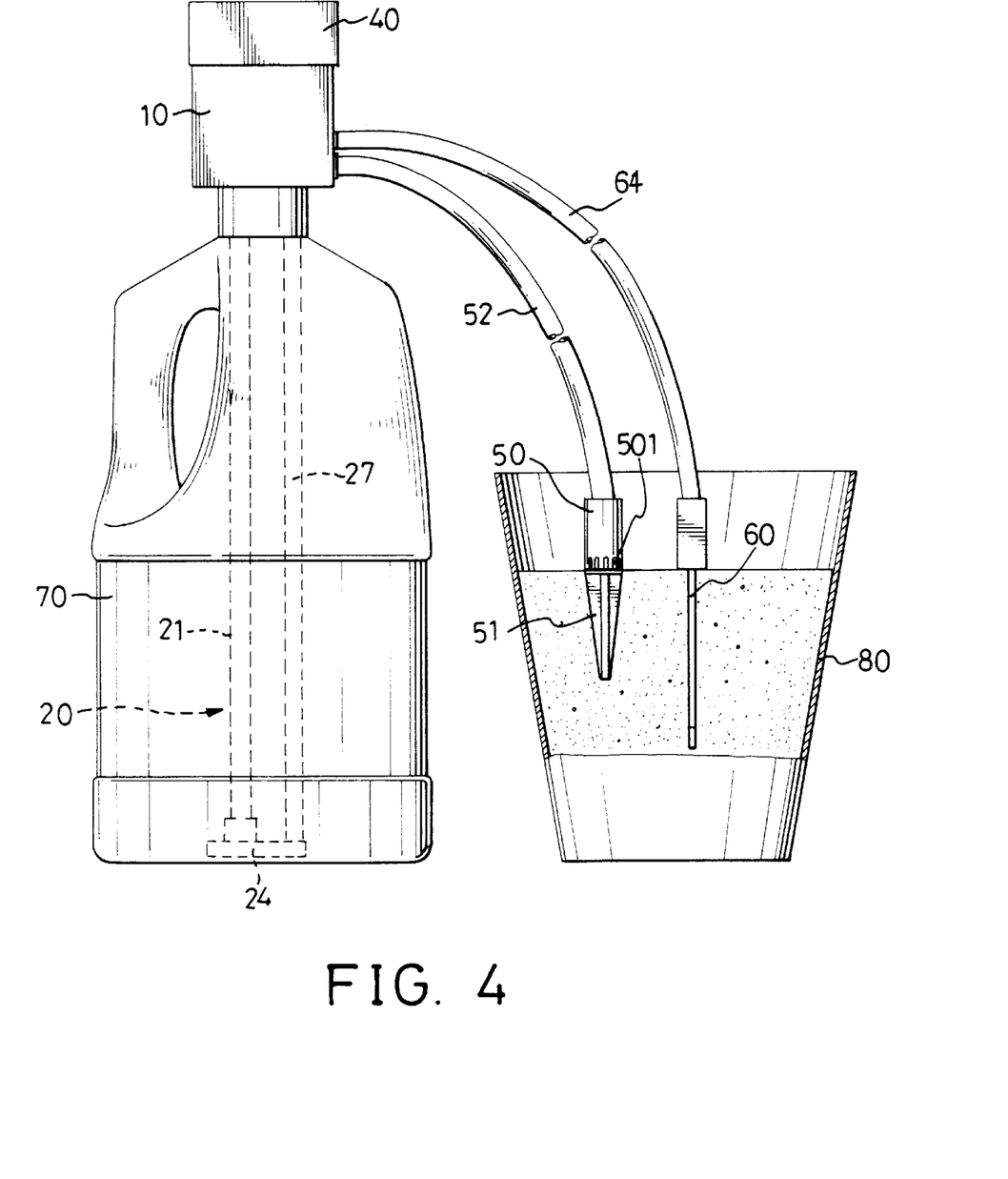
FIG. 4 is a preferred embodiment of the present invention.

In a practical application with reference to FIG. 4, the water pump 20 of the housing 10 can be inserted into a general container 70 and the like. The spike 51 of the water outlet device 50 and humidity sensing rod 60 are inserted into soil of the pot 80. A distal end portion of the humidity sensing rod 60 is completely inserted into the soil to provide an accurate humidity measurement of the soil. The outlets 501 of the water outlet device 50 are disposed slightly above a top surface of the soil in the pot 80.

Figure 7:
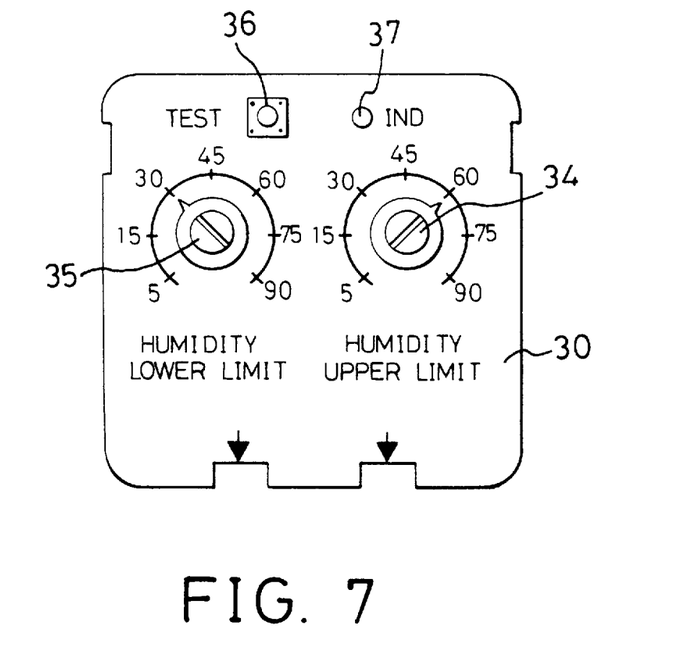
FIGS. 7 and 8 are schematic diagrams of the fixed-humidity mode and the fixed-amount mode control panels in accordance with the present invention.

In the circumstance described above, the aforesaid control circuit PCB 30 is set in a fixed-humidity mode, as shown in a control panel as shown in FIG. 7. The upper limit value and the lower limit value of the humidity are set by means of the two rotary switches 34, 35 respectively. When the humidity sensing rod 60 detects the moisture of the soil is not enough, the water outlet device 50 automatically receives pumped water from the container 70 and supplies the water through the water outlet device 50 to moisturize the soil after a delay of time. The above-described operation proceeds until the humidity of the soil increases to meet the set value. In the same way, when the moisture of the soil is too high, the operation of supplying water is halted temporarily. Thus, the moisture status of the soil is maintained the same as the set value by repeatedly detecting the moisture status of the soil. The test key 36 on the upper side of the control panel is adapted to determine whether the control circuit PCB 30 is in a normal operation state and the indicator light 37 thereof is adapted to determine whether the indicator light 37 turns on/off once whenever the detecting operation proceeds.

Figure 8:
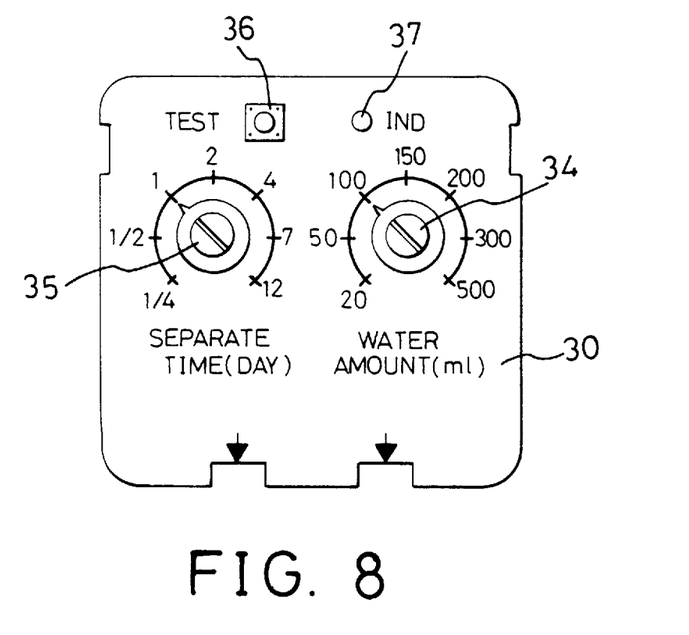

If the aforementioned control circuit PCB 30 is set to be in a fixed-amount mode, as shown in a control panel as shown in FIG. 8, the humidity sensing rod 60 can be removed without having any effect. In this fixed-amount mode, the time between two separate days for supplying water and the amount of the water used for supplying are respectively set by means of the two rotary switches 34, 35, and the control circuit PCB 30 performs a fixed-time turning on/off operation according to the predetermined state so that the potted plants are watered at a fixed time and in a fixed amount Regarding a method for operating in the fixed-humidity mode, the irrigation assembly detects the amount of the water contained in the soil every other six minutes after being powered on to prevent misoperation and energy saving. If the soil is too dry after comparing with a predetermined humidity value, the assembly pumps the water for two seconds (about 20 ml), counts the number of times the water is pumped and determines whether the number is greater than 15. This step primarily prevents the container from running out of water and thereby detects an abnormal situation happened such that it directly passes to the next step after the indicator light has flashed twice. If the soil is too wet after comparing with the predetermined humidity value, operation of the watering assembly is delayed for 60 minutes, and then, the amount of the water contained in the soil is determined again since the speed of evaporating the water is rather slow under the condition of containing too much water in the soil, and compared with a dry value subsequently. The humidity of the soil is controlled to be maintained at a predetermined value in accordance with the recycling operation.

As to a method for operating in the fixed-amount mode, after being powered on, the irrigation assembly reads a predetermined interval value set on a rotary switch and set the accumulated number of times to be zero and then, accumulates the interval and reads the accumulated interval. This accumulated interval value is compared with the previously accumulated interval value and is then compared with the predetermined interval value to see if they are the same. If the rotary switch has been turned to adjust the time, the above counting is renewed. If the rotary switch has not been turned for that adjustment, then the water-pumping motor operates the water pump to supply water at a fixed amount. Thereafter, the accumulated time value is set to be zero and the steps described above are repeated after the amount of water to be used has been supplied.

Accordingly, the present invention provides an automatic irrigation assembly for potted plants having a structure of a compact design and two-selection mode of fixed-humidity and fixed-amount for timely watering the potted plants to prevent the potted plants from being exposed to inappropriate irrigation.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:
1. An irrigation assembly for plants, comprising:
   a housing for containing batteries and a motor therein with a drain hole defined in one side of said housing;
   a water pumping means extending from a bottom portion of said housing to a container, said water pumping means pumping water contained in said container into said housing through said water conduit and discharging said water from said drain hole;
   a water outlet means connected to said drain hole of said housing through a water discharge pipe;
   a control circuit-printed circuit board means with rotary switches for setting a fixed-humidity/fixed-amount selection and a control circuit for controlling the electrical conduction opportunity of said motor formed thereon; and
   a humidity sensing means connected to said housing by electric wires in a waterproof cable, said humidity sensing means formed in a long strip, having a plurality of electrode contacts formed at various positions on a front surface and a rear surface thereof, and being directly inserted into soil of said potted plants.

2. An irrigation assembly for plants as recited in claimed 1, wherein said control circuit-printed circuit board means is pivotally connected to said housing internally and permits easy access to batteries therein for easy replacement thereof.

3. An irrigation assembly for plants as recited in claim 1, wherein said control circuit-printed circuit board means further has a test key and an indicator light installed thereon.

4. An irrigation assembly for plants as recited in claim 1, wherein said housing has a plurality of spring blades formed therein for confining said control circuit-printed circuit board means.

5. An irrigation assembly for plants as recited in claim 1, wherein said water outlet means is coupled with a spike for inserting into soil.

6. An irrigation assembly for plants as recited in claim 1, wherein a water conducing chamber is formed at a corner of said housing for adapting a flow between said water pumping means and said water outlet means.

7. An irrigation assembly for plants as recited in claim 1, wherein a top of said housing is covered by a waterproof cover.

8. An irrigation assembly for plants as recited in claim 1, wherein a long strip of conducting film is formed on one surface of said humidity sensing means and a plurality of spaced separate conducting films are formed on another surface of said humidity sensing means.

9. An irrigation assembly for plants as recited in claim 8, wherein said conducting film is substantially a layer of carbon film.

10. An irrigation assembly for plants as recited in claim 8, wherein one end of each of said spaced separate conducting films is connected to a respective first end of one of a plurality of resistors in series and a respective second end of each of the resistors is connected in parallel to form a single terminal.

\* \* \* \* \*